Nov. 23, 1937.   H. O. EWING   2,099,802

FUEL RECLAIMING DEVICE

Filed March 17, 1936   4 Sheets-Sheet 1

Inventor
H. O. Ewing,
By John R. Fowler
Attorney

Patented Nov. 23, 1937

2,099,802

UNITED STATES PATENT OFFICE 2,099,802

FUEL RECLAIMING DEVICE

Herbert O. Ewing, Middleport, Ohio

Application March 17, 1936, Serial No. 69,374

5 Claims. (Cl. 123—25)

This invention relates to a method of and means for economically reclaiming and rendering combustible the exhaust gases from internal combustion engines, and then adding the desired quantity of the reclaimed fuel to a fresh fuel charge and supplying the mixed fuels to engines as combustible charges.

A more specific object of my present invention is the provision of an attachment for liquid hydrocarbon or other carbon-bearing fuel internal combustion engines, which is constructed and arranged to divert a portion of the carbon-laden exhaust gases and mix them with air and pass them through water so that the desired proportions of hydrogen and oxygen are added or mixed with the diverted exhaust gases, and finally raising the temperature of these mixed gases to produce a highly combustible dry gas which is supplied to the intake manifold of the internal combustion engine.

It is also an object of this invention to provide a fuel reclaiming attachment, for internal combustion engines, embodying means for conveniently supporting or housing a body of water or other suitable fluid through which carbon-laden exhaust gases are filtered and humidified, and means for controlling the temperature of a portion of the water body in order to increase the efficiency of the attachment.

A further object of this invention is the provision of a fuel reclaiming attachment, for liquid hydrocarbon fuel internal combustion engines, embodying means for diverting a portion of the exhaust gases and treating such gases to render them combustible, and supplying the combustible gases to the engine fuel intake manifold and automatically controlling the quantity of fuel supplied to the engine commensurate with the requirements as determined by the engine's load or operating speed.

It is also an object of this invention to provide for liquid hydrocarbon fuel internal combustion engines a fuel reclaiming device of generally improved construction, whereby the device will be simple, durable, and inexpensive in construction as well as convenient, practical, serviceable and efficient in its use.

With the foregoing and other objects in view, which will appear as the description proceeds, the invention resides in the combination and arrangement of parts, and in the details of construction hereinafter described and claimed, it being understood that various changes in form, proportion, and minor details of construction may be made within the scope of the claims without departing from the spirit or sacrificing any advantages of the invention.

For a complete disclosure of the invention a detailed description of an improved fuel reclaiming device will now be given in connection with the accompanying drawings, forming a part of the specification, wherein.

Referring to the drawings in which similar reference characters designate corresponding parts, there is depicted an internal combustion engine 20 of the conventional liquid hydrocarbon fuel type which receives its fuel supply or charges through an intake manifold 21 from a conventional carburetor 22, and the exhaust gases are directed away from the engine by an exhaust manifold 23 and an exhaust conduit or line 25.

Figure 2:
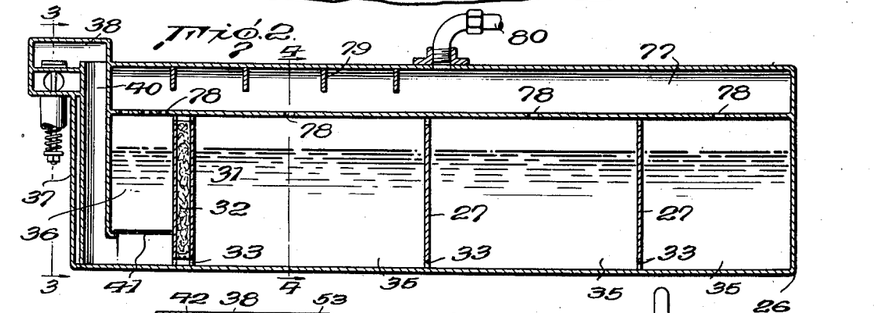
Figure 2 is an enlarged vertical longitudinal sectional view taken through the fluid tank or receptacle.

In order to effect marked economies in the operation of liquid hydrocarbon or other carbon fuel internal combustion engines, applicant has provided means for diverting a portion of the exhaust gases, reclaiming them, and feeding the reclaimed diverted exhaust gases back into the engine as fuel charges. To this end, a cylindrical water tank or receptacle 26 is provided having a plurality of spaced transverse partitions 27 positioned therein. At one end of the tank a double walled partition 31 is provided and has suitable water-resisting and heat-insulating material 32 interposed between these spaced partitions to form a composite insulated wall or partition. Small apertures 33 are formed in the partitions 27 and 31 at their bottom portion in order that fluid communication may be established in the compartments defined by these partitions, for reasons to be hereinafter disclosed.

Figures 3, 4:
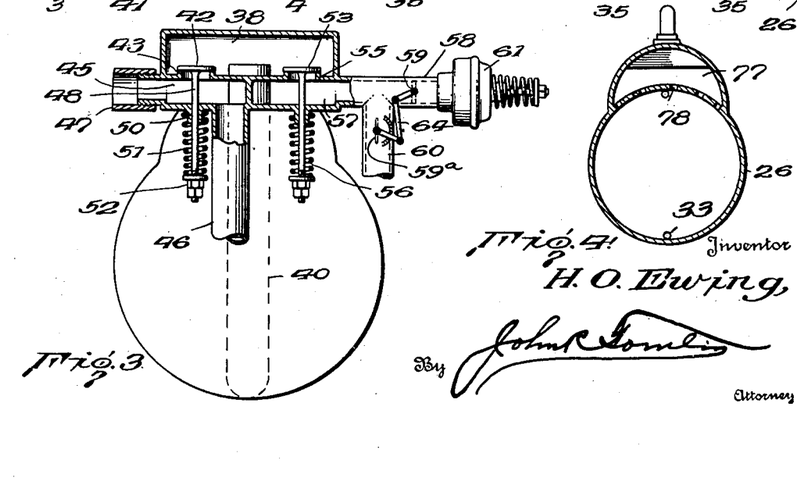
Figure 3 is a vertical transverse sectional view taken on the line 3—3 of Figure 2, parts being shown in elevation.
Figure 4 is a vertical transverse sectional view taken on the line 4—4 of Figure 2.
Figures 5, 6, 7, 8, 9, 10:
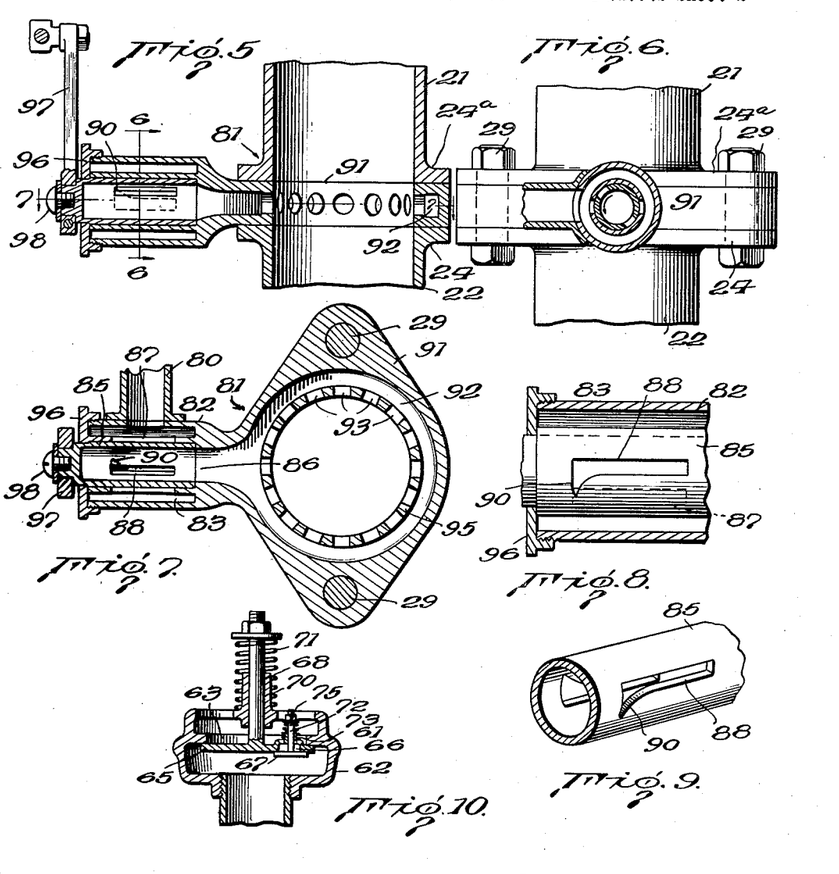
Figure 5 is a fragmental sectional view, parts appearing in elevation, depicting the control valve as applied to the intake manifold of an internal combustion engine.
Figure 6 is a vertical transverse sectional view taken on the line 6—6 of Figure 5.
Figure 7 is a horizontal sectional view taken on the line 7—7 of Figure 5.
Figure 8 is a detailed sectional view, parts appearing in elevation, depicting the fuel inlet ports of the control valve.
Figure 9 is a fragmental perspective view depicting the cylindrical valve and its controlling ports.
Figure 10 is a longitudinal sectional view taken through an air inlet or control valve.

Relatively large compartments 35 are provided in the tank or receptacle 26 between partitions 27 and 31, and a small compartment 36 is provided in this tank between the double walled insulating partition 31 and the end wall 37 of the tank, and the small compartment 36 communicates with a valve controlled mixing chamber 38 through an interposed conduit or pipe 40, for reasons to be hereinafter disclosed. The mixing chamber 38 is positioned preferably at the top and one end of the tank 26, and the conduit 40 extends from a point within the mixing chamber 38 downwardly through the tank 26 and the small compartment 36 and terminates in the lower portion of this small compartment. A perforated plate or screen 41 is secured horizontally in the small compartment 36 above the lower outlet or terminal of the conduit 40 to "break-up" or scatter the exhaust gases that pass through the conduit 40 into the small compartment 36. The mixing chamber 38 forms part of a valve casing in which a poppet valve 42 is operably positioned and which valve cooperates with a circular valve seat 43 interposed between the mixing chamber 38 and a port or chamber 45 which communicates with the engine exhaust manifold 23 through an interposed pipe or conduit 46. An outlet pipe or conduit 47 communicates with the chamber 45 and with the exhaust manifold 23, or directly to the atmosphere, as best suits the conditions to be met in the operation of this device, as will be hereinafter more fully explained. The poppet valve 42 is provided with a valve stem 48 which is slidably supported in a bearing sleeve or bracket 50 carried by the valve housing, and the valve 42 is normally biased or constrained towards closed position against its valve seat 43 by a helical spring 51 positioned on the valve stem 48 and held in operable position by suitable nuts 52. An air inlet valve 53, similar in construction and arrangement to the valve 42, is operably supported by the valve casing and is normally constrained in closed position against its valve seat 55 by a helical spring 56. The valve 53 is operably interposed between the mixing chamber 38 and an air inlet port or chamber 57, which, in turn, communicates with a cold air inlet pipe or conduit 58 and a heated air pipe or conduit 60. The cold air conduit 58 may terminate at any convenient point for the admission of the cold air, or, if desired, this conduit may have a composite air control device 61 secured to its terminal, as shown in Figures 3 and 10 of the drawings. This device comprises a valve casing 62 having a port 63 formed therein which is controlled by a relatively large valve 65. The large valve 65 is provided with a relatively small valve port or aperture 66, which, in turn, is controlled by a relatively small valve 67. A valve stem 68 extends from the valve 65 and is slidably mounted in a bearing sleeve 70 carried by the valve casing 62, and the valve 65 is biased towards and against its seat, which surrounds the port 63, by a helical spring 71. In order to operably support the small valve 67, it is provided with a valve stem 72 which is slidable within a bearing sleeve 73 carried by the large valve 65, and the small valve is constrained towards closed position by a helical spring 75. This composite air control or inlet device is constructed and arranged to admit desired quantities of air into its communicating conduit, and its operation will be more fully disclosed hereinafter. Any preferred means may be employed for heating the air which is conveyed to the mixing chamber 38 through the conduit 60, and a preferred means for heating the air is diagrammatically shown in Figure 1, in which the conduit or pipe 60 communicates with a heating coil 76 which has its convolutions positioned around the exhaust manifold 23, and its outer terminal may terminate at any convenient point for the admission of air therein, or, if desired, its outer terminal may be provided with a composite air control device 61, the detailed construction of which has been hereinbefore disclosed. The cylindrical tank 26 has a semi-cylindrical drying chamber 77 secured to or formed in the top thereof and it is coextensive therewith, and communication is established between the compartments 35 and 36 of the tank 26 and the drying chamber 77 through apertures 78 formed in the upper portion of the wall of the tank 26. Communication is established between the drying chamber 77 and the intake manifold 21 of the engine through interposed instrumentalities which include a conduit or pipe 80 connected with the upper portion of the semi-cylindrical heating chamber 77 and extends through the engine exhaust manifold 23 to a fuel charge proportioning device 81. The proportioning device 81 includes a housing having a valve casing 82 in which a cylindrical chamber 83 is formed, and a cylindrical valve 85 is rotatably mounted in the valve casing to control communication between the cylindrical valve chamber 83 and a valve conduit 86 defined by the inner wall of the cylindrical valve 85 and the cored cavity formed within the valve casing 82. Communication is established between the valve conduit 86 and the cylindrical chamber 83 of the valve through cooperating ports 87 and 88 formed in the valve casing 82 and the rotatable cylindrical valve 85 respectively. The ports 87 formed in the valve casing 82 are preferably rectangular in configuration, as shown in Figures 5, 7 and 8, and the ports 88, formed in the cylindrical valve 85, are substantially rectangular in configuration, but these ports are laterally enlarged at one terminal, as indicated at 90, and shown in Figures 5, 7, 8 and 9. The function of the cooperating ports 87 and 88 will be hereinafter disclosed. The housing of the charge proportioning device is provided with a relatively thin extension to define a gasket 91 which conforms to the configuration of the securing flanges 24 and 24a of the carburetor 22 and the engine intake manifold 21, respectively, as best shown in Figure 7, and it is secured thereto by bolts or other suitable securing devices 29. A circular chamber 92 is cored or otherwise formed in the gasket 91 and communicates with the cylindrical valve conduit 86, as best shown in Figure 7, and it also communicates with the engine intake manifold 21 through a plurality of apertures 93 formed in a circular inner wall 95 of the gasket 91. The cylindrical valve is mounted for rotation in the valve casing 82 and is held against outward or longitudinal movement by a retaining ring or collar 96 suitably secured to the valve casing 82, and an arm 97 is rigidly secured to the valve 85 by a screw or other suitable securing means 98.

Figure 1:
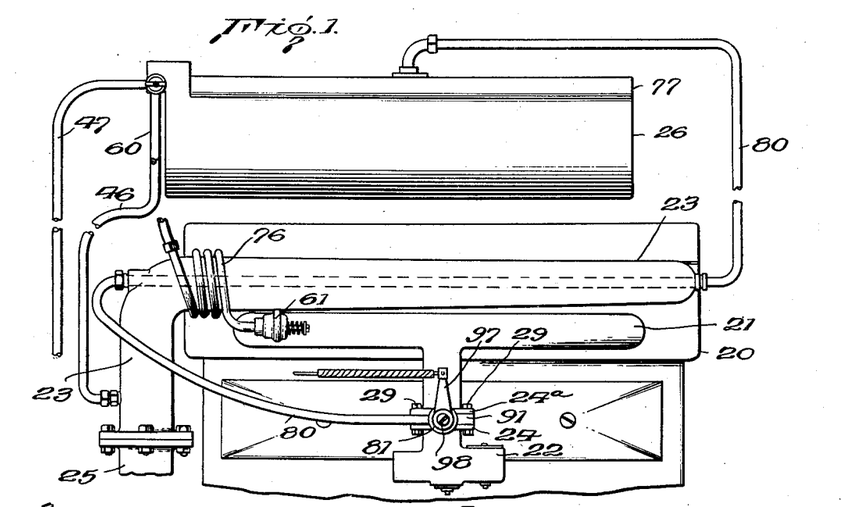
Figure 1 is a diagrammatic elevation showing the fuel reclaiming device as applied to an internal combustion engine, portions of the engine being fragmentally illustrated.

In operation, the intake stroke of the engine pistons produces subatmospheric pressure in the engine cylinders and intake manifold 21, thus drawing in a new fuel charge from the carburetor 22, in conformity with the usual practice. Inasmuch as the pressure of the engine intake manifold is communicated through the conduit 80, drying chamber 77, compartments 35 and 36, conduit 40 with the mixing chamber 38, the subatmospheric pressure produced by the intake stroke of the engine's pistons opens the valve 42 and draws into the mixing chamber 38 a portion of the exhaust gases from the exhaust manifold 23 through the inlet conduit 46, valve chamber 45, and past the valve 42. The remainder of the exhaust gases which pass through the conduit 46 continue to pass through the chamber 45, outlet conduit 47, back to the exhaust line, or directly to the atmosphere, if preferred. By this arrangement, hot exhaust gases are continuously passing through the valve chamber 45, thus heating the chamber 45, valve 42 and also imparting heat to the mixing chamber 38. The intake vacuum-producing impulses of the engine which open the valve 42 also open the valve 53 and draw into the mixing chamber 38 a quantity of air through the cold air conduit 58, hot air conduit 60 and air inlet chamber 57. Air of any desired temperature may be supplied to the air inlet port or chamber 57 by simply manipulating the butterfly valves 59 and 59a operably positioned in the cold air conduits 58 and hot air conduit 60 respectively. The butterfly valves 59 and 59a are operably connected by an interposed link 64, so that if one valve is closed the opposed valve is opened, thus giving accurate control over the proportions of hot or cold air that is supplied to the mixing chamber 38 past the valve 53. This air mixes in the mixing chamber 38 with the diverted exhaust gases, and the combined hot diverted exhaust gases and air are drawn downwardly through the conduit 40 into the water compartment 36, and then upwardly past the screen 41 and through the water in the chamber 36. As the combined air and carbon-laden diverted exhaust gases pass through the water in the chamber 36 they are filtered of impurities and also sufficiently humidified. From the compartment 36, the diverted exhaust gases and air pass through the apertures 78 above the compartment 36 through the drying chamber 77, past the baffle 79 and through the conduit 80. By providing the double wall partition 31 between the relatively small compartment 36 and the first large compartment 35, the greater portion of the heat which is liberated from the diverted exhaust gases, as they pass through the water in the compartment 36, is confined to this compartment, thereby maintaining the water therein at relatively high temperature. This arrangement has been found to be especially advantageous in cold weather, because, at low temperatures, the diverted exhaust gases do not impart sufficient heat to properly heat the water in the small compartment 36 and the remaining large compartments 35, but it does provide ample heat to maintain water in the small compartment 36 at the desired temperature. If the temperature of the water in the compartment 36 is allowed to drop too low, the carbon particles of the diverted exhaust gases tend to condense or solidify and gravitate to the bottom of the compartment, whereas, if the water is heated to sufficient temperature, all of the combustible ingredients of the diverted exhaust gases and components are conveyed upwardly through the small compartment and finally supplied to the engine as a fuel charge. Although the compartments 35 and 36 are separated by partitions 27 and 31 sufficient communication is established between these compartments through the apertures 33 to maintain a common water level in all the compartments. As the diverted exhaust gases pass through the drying chamber 77 and impinge the baffles 79, any excess water that may be present in the gases is liberated and drains back into the compartments 35 and 36, through the apertures 78 thereabove. The aerated and humidified diverted exhaust gases in passing through the conduit 80 are heated, because a portion of the conduit 80 passes through the exhaust manifold, as shown in Figure 1, thus producing a dry, volatile and combustible gas which is fed into the intake manifold 21 through the conduit 80, valve ports 87 and 88, valve conduit 86, circular chamber 92, apertures 93, where it mixes with the incoming new fuel charge from the carburetor 22 to provide an economical fuel charge for the engine. The quantity of reclaimed fuel admitted to the valve 82 is controlled by movement of the arm 97, thus causing the ports 87 and 88 to move relative to each other, thereby providing inlet aperture of varying dimensions. When the engine is idling only a small quantity of fuel is required, therefore, the port 88 formed in the valve 85 is laterally enlarged, as indicated at 90, so that only a small portion of the port 88 overlaps the port 87 when the valve is moved to idling adjustment. This prevents the subatmospheric pressure produced in the engine during idling or no load condition from drawing in an excessive quantity of reclaimed fuel gases.

It is now manifest that in applicant's device a portion of the normally dissipated exhaust gases are diverted and reclaimed, and then directed back into the engine intake manifold, together with a correctly proportioned quantity of new fuel to produce an economical fuel charge.

Figure 11:
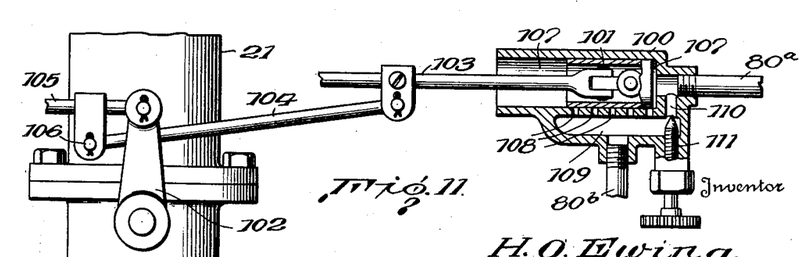
Figure 11 is a fragmental elevational view, parts appearing in section, showing a modified control valve operably connected with the fuel inlet instrumentalities of an internal combustion engine.

In Figure 11 a modified fuel control valve is depicted, which includes a valve casing 100 having a cylindrical bore or chamber 107 formed therein for the sliding reception of a piston 101. This piston is operably connected with the conventional throttle control arm 102 through an interposed rod 103 and connecting link 104. The link 104, in turn, is pivotally connected with a control rod or wire 105, as indicated at 106, and the control rod 105 may extend to any convenient point of manipulation or operation to open and close the engine intake manifold throttle in conformity with the usual practice. The reclaimed exhaust gases are conveyed into the valve chamber 107 by the pipe or conduit 80a, and the wall of the valve chamber 107 is perforated to provide a plurality of ports 108 which extend from the valve chamber 107 to an outlet chamber 109 formed in the valve casing. A bypass port 110 communicates with the valve chamber 107 and outlet chamber 109, and this port is controlled by a valve 111. The reclaimed exhaust gases are conveyed from the outlet chamber 109 through a pipe or conduit 80b to the engine intake manifold, and, inasmuch as the connections between the conduit 80b and the engine intake manifold may be made in any known or preferred manner it is not here illustrated.

As the throttle arm 102 is moved to open and close the engine throttle, not shown, the movement of the arm 102 slides the piston 101 back and forth in the valve chamber 107, thus opening one or more of the ports 108, in accordance with the degree of movement imparted to the piston 101. As the arm 102 is moved to open the engine throttle, the piston 101 uncovers additional ports 108, so that a greater quantity of reclaimed exhaust gases may feed through the conduit 80a, valve chamber 107, ports 108, outlet chamber 109 and conduit 80b, to the engine intake manifold. When the throttle is adjusted for idling or no load operating condition of the engine, all of the ports 108 are closed by the piston 101, but a small quantity of reclaimed fuel is fed through the by-pass port 110, and the correct quantity of such fuel may be determined by manipulating the valve 111.

Figures 12, 13, 14, 15, 16, 23:
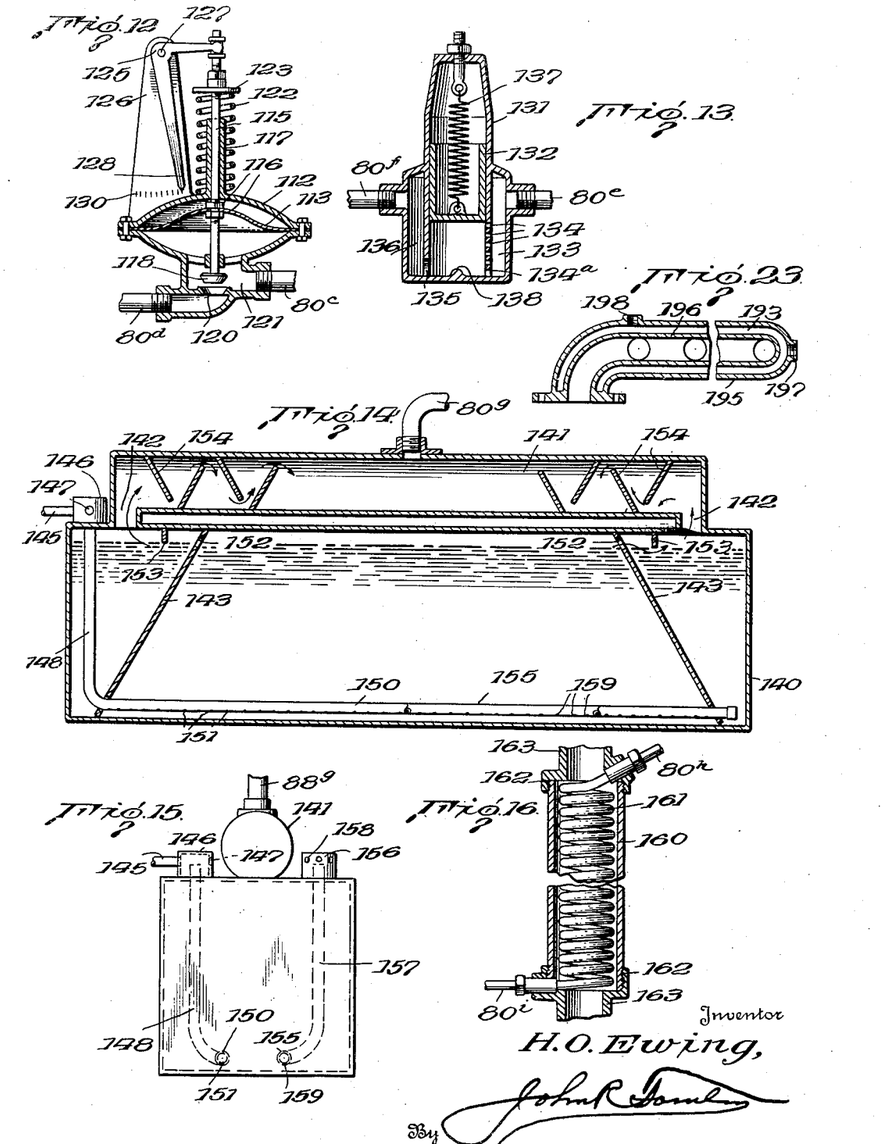
Figure 12 is a vertical sectional view, parts appearing in elevation, taken through another modified control valve.
Figure 13 is a longitudinal sectional view taken through another modified control valve.
Figure 14 is a vertical sectional view taken through a modified water or liquid container.
Figure 15 is an end view of the container shown in Figure 14.
Figure 16 is a longitudinal sectional view, parts appearing in elevation, showing a fuel heating coil positioned in the exhaust line of an internal combustion engine.
Figure 23 is a longitudinal sectional view taken through a preferred fuel heating jacket surrounding the engine exhaust manifold.

In Figure 12 another modified reclaimed fuel control valve is depicted, and this valve includes a valve casing 112 having a circular diaphragm 113 positioned therein, and this diaphragm is secured to a valve stem 115 by nuts or other suitable securing devices 116. The valve stem 115 is slidably mounted in a sleeve 117 carried by the valve casing 112, and the lower terminal of this stem 115 is provided with a valve head 118 adapted to cooperate with a frusto-conical valve seat 120 provided in the valve chamber 121 forming a part of the valve casing 112. A helical extension spring 122 surrounds the valve stem 115 and its guide sleeve 117, and the outer terminal of the spring 122 engages a collar 123 suitably secured to the valve stem, while the inner terminal of the spring engages the valve casing, thereby tending to force the valve 118 outwardly away from the seat 120. A bellcrank 125 is pivotally secured to a bracket 126 carried by the valve casing 112, as indicated at 127, and the lower terminal of the bellcrank 125 is pointed to provide an index or indicating finger 128 arranged to move in relation to a scale 130 to visually indicate the position of the valve 118 relative to its seat 120. The reclaimed fuel control valve is preferably positioned between the fuel mixing, humidifying and drying tank 26 and the engine intake manifold, and the pipe 80c leads from the tank 26 to the valve chamber 121, and a pipe or conduit 80d leads from the valve chamber 121 to the engine intake manifold. Inasmuch as the diaphragm 113 communicates with the valve chamber 121, the pressure within the engine intake manifold is communicated with the valve chamber 121 to control the movement of the diaphragm and the position of the valve 118 relative to its seat 120. When the pressure within the engine intake manifold is reduced, the diaphragm 113 is drawn inwardly against the tension of the spring 122, thus moving the valve 118 towards its seat 120 to reduce the quantity of reclaimed fuel gas passing through the valve chamber 121 into the engine intake manifold. As the pressure within the engine is increased towards atmospheric pressure, the spring 122 moves the diaphragm 113 upwardly away from the valve chamber 121, thereby moving the valve 118 away from its seat 120 to permit a greater quantity of reclaimed fuel to pass through the valve chamber 121 and into the engine intake manifold.

In Figure 13 a further modified reclaimed fuel control device is depicted, and this device includes a cylindrical valve casing 131 having a piston 132 slidably mounted therein. A chamber 133 is positioned at the side of one terminal of the cylindrical valve casing 131 and communicates with the interior of the valve casing through a series of spaced ports or apertures 134. A relatively large port 135 is formed in the wall of the valve casing 131 and communicates the interior of this valve casing with a chamber 136, for reasons to be hereinafter disclosed. This improved reclaimed fuel control valve is positioned between the mixing tank 26 and the engine intake manifold, and communication is established between the chamber 133 and the tank 26 through an interposed pipe or conduit 80e, and communication is established between the chamber 136 and the intake manifold of the engine through an interposed pipe or conduit 80f.

When the engine is running at idling speed, the relatively small fuel charges do not expand throughout the entire explosion strokes of the engine, consequently producing subatmospheric pressure within the engine cylinders and the intake manifold. This pressure is communicated to the interior of the valve casing 131, thereby drawing the piston 132 inwardly against the tension of a spring 137. As the piston moves inwardly it covers the ports 134, and, when it reaches its innermost position, its motion is limited by a stop lug 138. In this position the innermost port 134a still remains open so that a small quantity of fuel may be fed through the conduit 80e, chamber 133, port 134a, through the interior of the valve casing, port 135, chamber 136, and conduit 80f to the intake manifold of the engine. As the fuel charge is increased the pressure within the engine cylinders and intake manifold "rises" towards atmospheric pressure, thus permitting the spring 137 to withdraw the piston 132, thereby uncovering additional ports 134 to admit a larger charge of reclaimed fuel into the internal combustion engine intake manifold to meet the operating requirements of the engine.

In Figures 14 and 15 a modified reclaimed fuel mixing, humidifying and drying tank or receptacle is provided, and this tank includes a main casing 140 having a cylindrical drying chamber 141, and communication is established between the interior of the drying chamber 141 and the interior of the cylindrical casing 140 through apertures or ports 142 formed at the opposed ends of these members. Obliquely disposed partitions or plates 143 are positioned within the casing 140, and one plate 143 is preferably positioned adjacent each end of the casing 140. A portion of the engine's exhaust gases are diverted, as hereinbefore disclosed, and conveyed through a conduit 145 into a small cylindrical equalizing chamber 146 having an aperture 147 formed therein, preferably of the same diameter as the interior of the conduit 145, for reasons to be hereinafter set forth. The diverted exhaust gases are conveyed from the equalizing chamber 146 through a vertical conduit 148 which extends downwardly through the water body in the casing or tank 140 and then through a horizontally-disposed conduit 150 extending longitudinally through the bottom portion of the tank or casing 140. The horizontally-disposed conduit 150 is provided with perforations 151 through which the diverted exhaust gases escape and then pass upwardly through the body of water in the tank or casing 140 between the obliquely disposed partitions 143. The diverted exhaust gases are drawn upwardly through the body of water in the tank or casing 140 by the action of the engine pistons during the operation of the engine, and the subatmospheric pressure within the cylinders and intake manifold is communicated to the drying chamber 141 through a conduit 80g, thereby causing the diverted exhaust gases to pass upwardly from the conduit 150 through the body of water then through apertures 152 formed in the upper portion of the oblique partitions 143 above the water level, around the vertical baffles 153, through the ports 142 into the drying chamber 141, and past obliquely disposed baffles 154, where excess moisture is liberated from the diverted exhaust gases, and finally out through the conduit 80g to the engine intake manifold. As the diverted exhaust gases are drawn through the equalizing chamber 146, a quantity of air is drawn through the aperture 147 and is conveyed downwardly through the body of water by the conduit 148 and is finally liberated into the water by the perforations 151. Inasmuch as the aperture 147 is of predetermined proportion relative to the interior cross section of the conduit 145, a correctly proportioned quantity of air and exhaust gases are drawn into the equalizing chamber 146 and down through the conduit 148. A second horizontally-disposed conduit or pipe 155 extends longitudinally through the tank or casing 140 and is positioned parallel to and spaced from the horizontally-disposed conduit 150. The horizontal conduit 155 communicates with a second equalizing chamber 156 through an interposed vertical conduit 157, as best shown in Figure 15. The equalizing chamber 156 is provided with air inlet apertures 158, and, as the diverted exhaust gases are drawn upwardly through the body of water in the tank or casing 140 by the action of the internal combustion engine producing subatmospheric pressure in the engine cylinder and intake manifold, this action also draws a quantity of air through the apertures 158, vertical conduit 157, horizontal conduit 155, and then through apertures 159 formed therein, through the body of water and along the paths of travel taken by the diverted exhaust gases, as hereinbefore explained. The passing of the diverted exhaust gases and this air supply through the body of water and through the drying chamber produces an aerated and humidified combustible gas which is fed to the internal combustion engine, as hereinbefore disclosed.

In Figure 16 modified means for heating the reclaimed exhaust gases is illustrated, and this means includes a metallic casing 160 in which a helical coil 161 is positioned, and one terminal of this coil communicates with the reclaimed fuel mixing, humidifying and drying receptacle through an interposed conduit 80h, and the opposed terminal of the coil communicates with the intake manifold of the internal combustion engine through an interposed conduit 80i. The coil casing 160 is positioned in the exhaust line of an internal combustion engine by any preferred means, and in the present instance, the opposed terminals of the casing are threaded, as indicated at 162, for threaded engagement with the threaded terminals of exhaust pipes 163 positioned in the usual exhaust line. The reclaimed gases after being properly mixed with the desired quantities of hydrogen and oxygen from the air and water are then passed through the coil 161, where they are heated to produce a dry combustible gas, and finally conveyed to the intake manifold of the internal combustion engine, as hereinbefore disclosed.

Figures 17, 18, 19, 20:
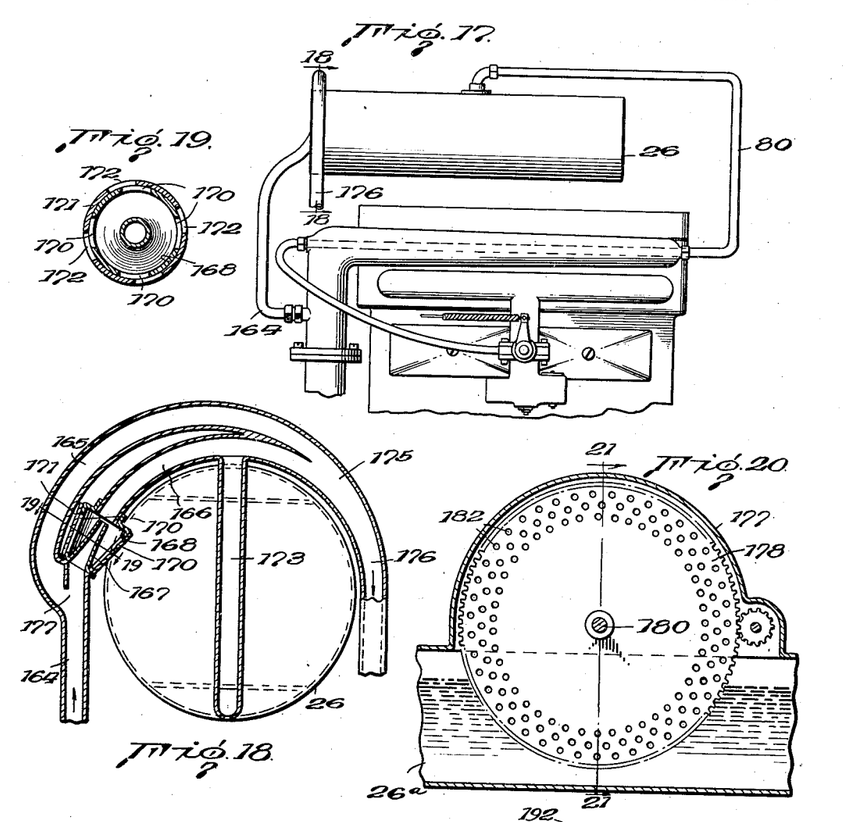
Figure 17 is a diagrammatic elevation showing a modified fuel reclaiming device as applied to an internal combustion engine, portions of the engine being fragmentally illustrated.
Figure 18 is a vertical detailed sectional view taken on the line 18—18 of Figure 17.
Figure 19 is a transverse detailed sectional view taken on the line 19—19 of Figure 18.
Figure 20 is a fragmental vertical sectional view depicting a modified moistening or humidifying device.

In Figures 17, 18 and 19, a preferred form of my invention is depicted, and this form includes the hereinbefore disclosed water tank or receptacle 26, to which the diverted exhaust gases are conveyed from the exhaust manifold through a conduit 164, which is bifurcated to define arcuate branches 165 and 166 extending from the conduit 164 around the water tank or receptacle 26, as best shown in Figure 18. As the gases flow from the conduit 164 past its point of bifurcation 177, a portion of them are directed into the arcuate branch 165 and a portion directed through a nozzle or restricted tube 167, and then into the arcuate conduit 166. A frusto conical mixing chamber 168 surrounds the nozzle 167, and this chamber is provided with spaced air inlet apertures 170, best shown in Figures 18 and 19, and a valve sleeve 171 is rotatably mounted on the outer wall of the frusto conical mixing chamber 168, and this valve sleeve is provided with spaced apertures 172 to cooperate with the spaced apertures 170 to admit the desired quantity of air into the chamber 168 and the arcuate branch 166 of the conduit. A conduit 173 extends downwardly from the conduit 166 through the tank or receptacle 26, similar to the arrangement of the conduit 40, disclosed in Figure 2. The arcuate branches 165 and 166 defined by the bifurcations of the conduit 164 are reunited at the point indicated by 175 to define a conduit 176 which leads back to the exhaust line, or directly to the atmosphere, if preferred, similar to the arrangement of the conduit 47 disclosed in Figure 1.

In this device the diverted exhaust gases are fed through the conduit 164, and a portion of them are diverted at the point of bifurcation 177 into the arcuate branch 165. The remaining gases pass through the nozzle 167 and into the arcuate branch 166, and then into the conduit 176. As the gases pass through the nozzle 167, a venturi action is set up, thereby increasing the velocity of the gases at this point, and these onrushing gases draw in air through the cooperating ports or apertures 170 and 172. This air is mixed with the diverted exhaust gases, and a portion of the combined air and gases passes downwardly through the conduit 173, through the water tank or receptacle 26, in the manner hereinbefore disclosed. The diverted exhaust gases and air passing through the conduit branches 165 and 166 are united at the point 175, and the velocity of the gas passing through the branch 165 into the conduit 176 tends to draw along the gases present in the branch 166, and, conversely, the velocity of the gases passing through the branch 166 into the conduit 176 tends to draw along the gases present in the branch 165. The quantity of air admitted into the chamber 168 may be controlled by rotating the valve sleeve 171 so that the apertures 172 of the sleeve are positioned in desired relation to the apertures 170 of the mixing chamber 168, so that the effective inlet area produced by these apertures is adjusted to admit the proper quantity of air. By this arrangement a properly proportioned reclaimed fuel charge is conveyed to the water tank 26, and, furthermore, hot gases are continuously supplied into and around one terminal of the water tank thereby maintaining the water in this portion of the tank at a high temperature.

Figure 21:
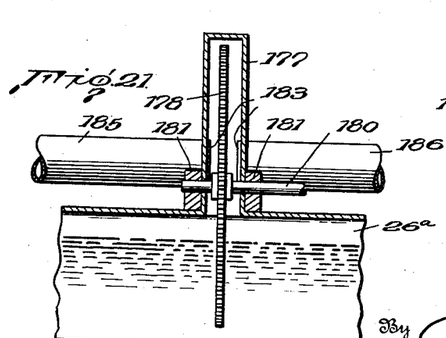
Figure 21 is a vertical sectional view taken on the line 21—21 of Figure 20.

In Figures 20 and 21, there is depicted a device for mechanically supplying moisture to the diverted exhaust gases, and this device includes a tank or receptacle 26a for the reception of water or other suitable liquid and a semi-cylindrical housing 177 which extends upwardly from the tank 26a for the reception of a fluid-elevating disc 178. The disc 178 is secured to a shaft 180 rotatably mounted in bearings 181 supported by the receptacle 26a and housing 177. Any suitable means, not shown, may be provided for rotating the disc, but it is preferably driven from some operating component of the engine so that the disc rotates while the engine is running. Perforations 182 are formed in the disc 178 adjacent its periphery, and as the disc rotates these perforations pass through the water in the tank 26a where they are filled with water, and, as the peripheral portion of the disc moves upwardly, a suitable supply of water is carried therewith past adjacent terminals 183 of pipes or conduits 185 and 186. The conduit 185 leads from the exhaust manifold of the engine and a suitable air-mixing chamber to the semi-cylindrical housing 177, and its terminal 183 is positioned adjacent the peripheral portion of the disc 178. The terminal 183 of the conduit 186 is also similarly positioned with relation to the semi-cylindrical housing 177 and disc 178 and the conduit 186 extends from this housing through a heater to the intake manifold of the internal combustion engine. Inasmuch as the connection of the conduits for conveying diverted exhaust gases from the engine exhaust manifold back into the intake manifold have been amply illustrated hereinbefore, the connections of the conduits 185 and 186 with the engine exhaust manifold mixing chamber, heater and intake manifold, respectively, are not illustrated in this immediate disclosure. As the exhaust gases flow through the conduits 185 and 186 from the engine's exhaust manifold back to the intake manifold, these gases pick up or absorb moisture which is conveyed upwardly by the perforations 182 of the disc 178, and these moistened or humidified exhaust gases are consequently conveyed to the intake manifold of the engine in the form of an explosive charge.

Figure 22:
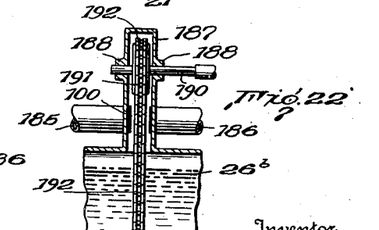
Figure 22 is a similar vertical sectional view taken through a modified moistening or humidifying device.

In Figure 22, a modified device for humidifying the diverted exhaust gases is depicted, and this device includes a tank or receptacle 26b, and a semi-cylindrical housing 187, carrying bearings 188 for rotatably supporting a shaft 190 to which a sprocket 191 is secured. A chain 192 is trained around this sprocket and is suspended in the water within the tank 26b, and as the sprocket 191 rotates the chain 192 conveys water upwardly past the adjacent terminals 183 of the conduits 185 and 186 to cause the diverted exhaust gases to pick up moisture as it passes through the housing 187 so that the humidified diverted exhaust gases are conveyed through a suitable heater to the intake manifold of the engine, as hereinbefore disclosed, in the form of combustible fuel charges.

In Figure 23 a preferred means for heating the diverted exhaust gases is depicted and it includes a chamber 193 defined by an outer wall or casing 195 surrounding the conventional internal combustion engine exhaust manifold 196. The diverted exhaust gases are admitted into the chamber 193 through an inlet aperture 197 where they are heated to a relatively high temperature by the hot manifold 196 and then these gases pass outwardly through the aperture 198 and are conveyed to the intake manifold of the engine, as hereinbefore disclosed.

By heating the reclaimed diverted exhaust gases to relatively high temperature, a highly combustible fuel charge is produced because the carbon in the exhaust gases will flash or fire in the presence of the relatively small new fuel charge at the high temperatures produced by the hereinbefore disclosed heating arrangements and the ignition instrumentalities of the internal combustion engine.

Having thus described my invention, I claim:

1. In a charge forming device for internal combustion engines, means for diverting a portion of the engine's exhaust gas, means for mixing air with the diverted exhaust gas, means for supplying moisture to the diverted exhaust gas, means for removing excess moisture from the diverted exhaust gas, means for heating the diverted exhaust gas subsequent to supplying the moisture, and means for mixing the diverted exhaust gas with a fresh fuel charge in proper proportions to produce an explosive charge, the explosive charge being directed into the engine intake manifold.

2. In a charge forming device for internal combustion engines, means for diverting a portion of the engine's exhaust gas, a mixing chamber, means to supply air to the mixing chamber, a water receptacle, means for directing the diverted exhaust gas to the mixing chamber to therein mix with the air, means for directing the said mixed gas and air to and through the water by the suction produced by the engine, means for removing excess moisture, means for heating the diverted gas and air subsequent to passing them through the water, and means for inducting the heated diverted exhaust gas and air into the intake manifold.

3. In a charge forming device for internal combustion engines, a mixing chamber, an air inlet for the mixing chamber, a water receptacle, means for communicating the mixing chamber and water receptacle, means for diverting a portion of the engine's exhaust gas and communicating the diverted gas with the mixing chamber and water receptacle, means for communicating the water receptacle with the engine's intake manifold whereby the suction produced by the engine's intake action draws air into the mixing chamber to mix with the diverted exhaust gas and draws the diverted gas and air through the water, means interposed between the water receptacle and the engine whereby the diverted exhaust gas travels through a tortuous path to remove excess moisture from the exhaust gas after it has passed through the water, means for heating the diverted exhaust gas subsequent to passing it through the water, the said means for communicating the water receptacle with the intake manifold directing the heated exhaust gas into the manifold.

4. In a charge forming device for internal combustion engines, means for diverting a portion of the engine's exhaust gas, a mixing chamber communicated with the diverted exhaust gas, an air inlet for the mixing chamber to admit air into the mixing chamber to therein mix with the gas, a receptacle containing a body of water communicated with the mixing chamber, a drying chamber having a tortuous path communicated with the body of water, and heating means communicated with the drying chamber and engine intake manifold whereby the suction produced by the intake strokes of the engine draws the mixed gas and air from the mixing chamber through the body of water, drying chamber, heating means and into the intake manifold of the engine.

5. In a charge forming device for internal combustion engines, a bifurcated conduit, means for diverting a portion of the engine's exhaust gas into the bifurcated conduit, a mixing chamber, one of the branches of the bifurcated portion of the conduit extending into the mixing chamber, air inlets in the mixing chamber to admit air into the mixing chamber to mix with the diverted exhaust gas, a water receptacle, excess moisture removing means, heating means, and means for introducing the mixed gas and air from the mixing chamber into the body of water and directing them through the body of water, said moisture removing means, heating means and into the engine intake manifold by the intake action of the engine.

HERBERT O. EWING.